United States Patent
Tang et al.

(10) Patent No.: US 11,696,272 B2
(45) Date of Patent: Jul. 4, 2023

(54) UPLINK TRANSMISSION METHOD, TERMINAL DEVICE AND NETWORK DEVICE

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 61 days.

(21) Appl. No.: 16/345,462

(22) PCT Filed: Nov. 3, 2016

(86) PCT No.: PCT/CN2016/104449
§ 371 (c)(1),
(2) Date: Apr. 26, 2019

(87) PCT Pub. No.: WO2018/081977
PCT Pub. Date: May 11, 2018

(65) Prior Publication Data
US 2019/0261341 A1     Aug. 22, 2019

(51) Int. Cl.
*H04W 72/00* (2023.01)
*H04W 72/044* (2023.01)
(Continued)

(52) U.S. Cl.
CPC ............ *H04W 72/046* (2013.01); *H04B 7/26* (2013.01); *H04W 72/12* (2013.01); *H04W 72/21* (2023.01)

(58) Field of Classification Search
None
See application file for complete search history.

(56) References Cited

U.S. PATENT DOCUMENTS

| 2013/0215844 A1 | 8/2013 | Seol et al. |
| 2015/0049650 A1 | 2/2015 | Choi |

(Continued)

FOREIGN PATENT DOCUMENTS

| CN | 101114868 A | 1/2008 |
| CN | 102088303 A | 6/2011 |

(Continued)

OTHER PUBLICATIONS

3GPP TSG-RAN WG1 #86; R1-167466; Goteborg, Sweden, Aug. 22-26, 2016.

(Continued)

*Primary Examiner* — Alex Skripnikov
(74) *Attorney, Agent, or Firm* — Young Basile Hanlon & MacFarlane, P.C.

(57) ABSTRACT

An uplink transmission method, a terminal device and a network device are provided. The method includes: receiving, by a terminal device, indication information sent by a network device, the indication information being used for indicating a beam corresponding to at least one uplink transmission channel of the terminal device, wherein a beam corresponding to each uplink transmission channel is used for transmitting the each uplink transmission channel; and performing, by the terminal device, uplink transmission according to the indication information.

14 Claims, 3 Drawing Sheets

(51) Int. Cl.
*H04W 72/12* (2023.01)
*H04B 7/26* (2006.01)
*H04W 72/21* (2023.01)

(56) References Cited

U.S. PATENT DOCUMENTS

| | | | |
|---|---|---|---|
| 2016/0099763 A1 | 4/2016 | Chen | |
| 2016/0352403 A1* | 12/2016 | Kishiyama | H04B 7/0413 |
| 2016/0359536 A1 | 12/2016 | Guo et al. | |
| 2017/0346539 A1* | 11/2017 | Islam | H04B 7/0695 |

FOREIGN PATENT DOCUMENTS

| | | | |
|---|---|---|---|
| CN | 104734763 A | 6/2015 | |
| CN | 105812035 A | 7/2016 | |
| CN | 105940699 A | 9/2016 | |
| JP | 2015-165640 A | 9/2015 | |
| RU | 2532248 C2 | 11/2014 | |
| WO | 2015090058 A1 | 6/2015 | |
| WO | 2015099497 A1 | 7/2015 | |
| WO | 2016006964 A1 | 1/2016 | |
| WO | 2016099345 A1 | 6/2016 | |
| WO | 2017204932 A1 | 11/2017 | |

OTHER PUBLICATIONS

Extended European search report issued in corresponding European application No. 16920550.7 dated Sep. 20, 2019.
3GPP TSG RAN WG1 Meeting #86bis; Libson, Portugal, Oct. 10-14, 2016; Agenda item 8.1.3.1; R1-1610984.
First Canadian Office Action dated May 26, 2020 from Application No. 3042440.
English Translation of Second CL Office Action dated Jun. 18, 2020 from Application No. 201901230.
English Translation of Second Chinese Office Action dated Jul. 14, 2020 from Application No. 201680090606.6.
3GPP TSG-RAN WG1 #86; Gothenburg, Sweden, Aug. 22-26, 2016; R1-167128.
3GPP TSG RAN WG1 Meeting #85; Nanjing, China May 23-27, 2016; R1-163960.
SG First Written Opinion application No. 11201903936Y dated May 9, 2020.
English translation of Chinese Office Action for Chinese Application No. 201680090606.6 dated Mar. 27, 2020.
English translation of Russia Notice of Allowance for Russian Application No. 2019116270/07(031069) dated Jan. 24, 2020.
Notice of Reasons for Refusal with English Translation for Japanese Patent Application No. 2019-523632 dated Oct. 27, 2020.
3GPP TSG-RAN WG1 #86 Bis; Lisbon, Portugal, Oct. 10-14, 2016; R1-1610239.
3GPP TSG-RAN WG1 #86 Bis; Lisbon, Portugal, Oct. 10-14, 2016; R1-1610240.
3GPP TSG RAN WG1 Meeting #87; Reno, USA, Nov. 14-18, 2016; R1-1612156.
India Examination Report for IN Application 201917018621 dated Sep. 20, 2020.
Brazil Search Report with English Translation for BR Application BR112019009107-6 dated Aug. 24, 2020.
China Notice of Rejection with English Translation for CN Application 201680090606.6 dated Nov. 4, 2020.
3GPP TSG RAN WG1 Meeting #86bis; Lisbon, Portugal, Oct. 10-14, 2016; R1-1610891.
Canada Second Office Action for CA Application 3,042,440 dated Feb. 25, 2021.
Israel First Office Action with English Translation for IL Application 266328 dated Dec. 14, 2020.
Singapore Second Written Opinion for SG Application 11201903936Y dated Mar. 1, 2021.
Indonesia Notice of Substantive Exam for ID Application P00201904526 dated Apr. 26, 2021.
Communication pursuant to Article 94(3) EPC Examination for EP Application 169205507 dated Mar. 23, 2021.
Australian Examination Report for AU Application 2016428410 dated Aug. 12, 2021. (3 pages).
Chinese Notice of Re-Examination with English Translation for CN Application 201680090606.6 dated Jun. 21, 2021. (16 pages).
Taiwan Office Action with English Translation for TW Application 106137572 dated Aug. 11, 2021. (23 pages).
Chinese Notice of Reexamination with English Translation for CN Application 201680090606.6 dated Sep. 22, 2021. (15 pages).
3 GPP TSG RAN WG1 #36 Malaga Spain, R1-040195, Alcatel, Fast Beam Selection in Soft Handover, Feb. 16-20, 2004. (4 pages).
3GPP TSG RAN WG1 Meeting #82b Malmo, Sweden, R1-156122, Samsung, Rank 3-8 codebook for class A CSI reporting, Oct. 5-9, 2015. (9 pages).
3GPP TSG RAN WG1 Meeting #86 Gothenburg, Sweden, R1-167208, Huawei, HiSilicon, Discussion on NR UL MIMO, Aug. 22-26, 2016. (4 pages).
3GPP TSG RAN WG1 #86 bis Lisbon, Portugal, R1-1609082, Samsung, Impact of beam/channel reciprocity for NR, Oct. 10-14, 2016. (4 pages).
3GPP TSG RAN WG1 Meeting #86bis Lisbon, Portugal, R1-1609414, Huawei, HiSilicon, Discussion on beam management aspects for DL MIMO, Oct. 10-14, 2016. (5 pages).
Australian Examination Report for AU Application 2016428410 dated Feb. 6, 2022. (3 pages).
Chinese Office Action with English Translation for CN Application 201680090606.6 dated Jan. 6, 2022. (46 pages).
Israel Office Action with English Translation for IL Application 266328 dated Feb. 8, 2022. (5 pages).
Japanese Office Action with English Translation for JP Application 2021065333 dated Feb. 25, 2022. (12 pages).
Singapore Notice of Eligibility for Grant for SG Application 11201903936Y dated Mar. 8, 2022. (6 pages).
Australian Examination Report for AU Application 2016428410 dated May 12, 2022. (4 pages).
Japanese Notice of Reasons for Refusal with English Translation for JP Application 2021065333 dated Sep. 27, 2022. (10 pages).

* cited by examiner

UPLINK TRANSMISSION METHOD, TERMINAL DEVICE AND NETWORK DEVICE

CROSS-REFERENCE TO RELATED APPLICATION(S)

This application is a 371 application of International Application No. PCT/CN2016/104449, filed on Nov. 3, 2016, the entire disclosure of which is hereby incorporated by reference.

TECHNICAL FIELD

Implementations of the present disclosure relate to the communication field, and more particularly, to an uplink transmission method, a network device and a terminal device.

BACKGROUND

In the future wireless communication systems, with continuous rising of application frequency bands, challenge to coverage becomes more and more serious, so a beam forming technology is used as a key technology to improve the capability of coverage of a network.

Future wireless communication systems, such as 5G communication systems, will use higher communication frequency bands. In a higher communication frequency band, a beam between a base station and a terminal device is easily blocked due to an obstacle, movement of a UE and other factors, resulting in a failure of uplink transmission of the terminal device and adverse effect on communication quality between a network device and the terminal device.

SUMMARY

Implementations of the present disclosure provide an uplink transmission method, a terminal device and a network device.

In a first aspect, an uplink transmission method is provided, which includes: receiving, by a terminal device, indication information sent by a network device, the indication information being used for indicating a beam corresponding to at least one uplink transmission channel of the terminal device, wherein a beam corresponding to each uplink transmission channel is used for transmitting the each uplink transmission channel; and performing, by the terminal device, uplink transmission according to the indication information.

In connection with the first aspect, in some implementations of the first aspect, the indication information includes information of a target beam, and the indication information is specifically used to indicate that the at least one uplink transmission channel uses the target beam for uplink transmission.

In connection with the first aspect, in some implementations of the first aspect, the information of the target beam includes a beam identity of the target beam.

In connection with the first aspect, in some implementations of the first aspect, the information of the target beam includes a beam index of the target beam, and the beam index of the target beam is used to indicate which beam in a pre-configured beam group is the target beam.

In connection with the first aspect, in some implementations of the first aspect, the indication information includes information of a beam corresponding to each uplink transmission channel in the at least one uplink transmission channel.

In connection with the first aspect, in some implementations of the first aspect, the information of the beam corresponding to each uplink transmission channel includes a beam identity of the beam corresponding to the each uplink transmission channel.

In connection with the first aspect, in some implementations of the first aspect, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

In connection with the first aspect, in some implementations of the first aspect, the beam group is a beam group configured by the network device to the terminal device through a high-level signaling.

In connection with the first aspect, in some implementations of the first aspect, the at least one uplink transmission channel is a part of uplink transmission channels of the terminal device, and beams corresponding to remaining uplink transmission channels of the terminal device except the part of the uplink transmission channels remain unchanged.

According to the first aspect, in some implementations of the first aspect, the performing, by the terminal device, uplink transmission according to the indication information includes: determining, by the terminal device, beams corresponding to various uplink transmission channels of the terminal device according to the indication information; and performing, by the terminal device, the uplink transmission according to the beams corresponding to the various uplink transmission channels of the terminal device.

According to the first aspect, in some implementations of the first aspect, the uplink transmission channels of the terminal device include a first uplink transmission channel and a second uplink transmission channel, and the first uplink transmission channel and the second uplink transmission channel correspond to different beams, the performing, by the terminal device, the uplink transmission according to the beams corresponding to various uplink transmission channels of the terminal device includes: when time domain resources occupied by the first uplink transmission channel and the second uplink transmission channel overlap, if transmission power of the terminal device is insufficient, performing, by the terminal device, a puncturing processing on the first uplink transmission channel or the second uplink transmission channel, or adjusting, by the terminal device, transmission power of the first uplink transmission channel or the second uplink transmission channel.

According to the first aspect, in some implementations of the first aspect, the uplink transmission channels of the terminal device include a first uplink transmission channel and a second uplink transmission channel, and the first uplink transmission channel and the second uplink transmission channel correspond to different beams, the performing, by the terminal device, the uplink transmission according to the beams corresponding to various uplink transmission channels of the terminal device includes: when time domain resources occupied by the first uplink transmission channel and the second uplink transmission channel overlap, or an overlapping degree of the time domain resources occupied by the first uplink transmission channel and the second uplink transmission channel is greater than a pre-determined threshold, transmitting, by the terminal device, the first uplink transmission channel through a beam corresponding to the second uplink transmission channel.

In combination with the first aspect, in some implementations of the first aspect, the performing, by the terminal device, the uplink transmission according to the beams corresponding to various uplink transmission channels of the terminal device further includes: when the time domain resources occupied by the first uplink transmission channel and the second uplink transmission channel do not overlap, or the overlapping degree of the time domain resources occupied by the first uplink transmission channel and the second uplink transmission channel is less than the pre-determined threshold, transmitting, by the terminal device, the first uplink transmission channel through a beam corresponding to the first uplink transmission channel.

According to the first aspect, in some implementations of the first aspect, the network device is a first network device, the first network device communicates with the terminal device through an auxiliary beam, and the terminal device further communicates with a second network device through a main beam, the receiving, by the terminal device, the indication information sent by the network device includes: when the main beam is blocked, receiving, by the terminal device, the indication information sent by the first network device through the auxiliary beam, wherein the indication information is used to instruct the terminal device to use the auxiliary beam to perform uplink transmission.

In connection with the first aspect, in some implementations of the first aspect, the network device is a first network device, the receiving, by the terminal device, the indication information sent by the network device includes: receiving, by the terminal device, the indication information sent by the first network device, wherein the indication information is used to instruct the terminal device to switch to a second network device and perform uplink transmission with the second network device based on the beam corresponding to the at least one uplink transmission channel.

According to the first aspect, in some implementations of the first aspect, the uplink transmission channels of the terminal device include a first uplink transmission channel and a second uplink transmission channel, wherein the first uplink transmission channel is a physical uplink control channel, PUCCH, and the second uplink transmission channel is a physical uplink shared channel, PUSCH.

In connection with the first aspect, in some implementations of the first aspect, the indication information is specific indication information for a terminal device, or the indication information is specific indication information for a group of terminal devices.

In connection with the first aspect, in some implementations of the first aspect, the indication information is sent by the network device through downlink control information, DCI.

In a second aspect, an uplink transmission method is provided, which includes: generating, by a network device, indication information for indicating a beam corresponding to at least one uplink transmission channel of a terminal device, wherein a beam corresponding to each uplink transmission channel is used for transmitting the each uplink transmission channel; and sending, by the network device, the indication information to the terminal device.

In connection with the second aspect, in some implementations of the second aspect, the indication information includes information of a target beam, and the indication information is specifically used to indicate that the at least one uplink transmission channel uses the target beam for uplink transmission.

In connection with the second aspect, in some implementations of the second aspect, the information of the target beam includes a beam identity of the target beam.

In connection with the second aspect, in some implementations of the second aspect, the information of the target beam includes a beam index of the target beam, and the beam index of the target beam is used to indicate which beam in a pre-configured beam group is the target beam.

In connection with the second aspect, in some implementations of the second aspect, the indication information includes information of a beam corresponding to each uplink transmission channel in the at least one uplink transmission channel.

In connection with the second aspect, in some implementations of the second aspect, the information of the beam corresponding to each uplink transmission channel includes a beam identity of the beam corresponding to the each uplink transmission channel.

In connection with the second aspect, in some implementations of the second aspect, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

In connection with the second aspect, in some implementations of the second aspect, the beam group is a beam group configured by the network device to the terminal device through a high-level signaling.

In connection with the second aspect, in some implementations of the second aspect, the at least one uplink transmission channel is a part of uplink transmission channels of the terminal device, and beams corresponding to remaining uplink transmission channels of the terminal device except the part of the uplink transmission channels remain unchanged.

In combination with the second aspect, in some implementations of the second aspect, the uplink transmission channels of the terminal device include a first uplink transmission channel and a second uplink transmission channel, and the first uplink transmission channel and the second uplink transmission channel correspond to different beams, the method further includes: when time domain resources occupied by the first uplink transmission channel and the second uplink transmission channel overlap, or an overlapping degree of the time domain resources occupied by the first uplink transmission channel and the second uplink transmission channel is greater than a pre-determined threshold, receiving, by the network device, the first uplink transmission channel through a beam corresponding to the second uplink transmission channel.

In combination with the second aspect, in some implementations of the second aspect, the method further includes: when the time domain resources occupied by the first uplink transmission channel and the second uplink transmission channel do not overlap, or the overlapping degree of the time domain resources occupied by the first uplink transmission channel and the second uplink transmission channel is less than the pre-determined threshold, receiving, by the network device, the first uplink transmission channel through a beam corresponding to the first uplink transmission channel.

In connection with the second aspect, in some implementations of the second aspect, the network device is a first network device, the first network device communicates with the terminal device through an auxiliary beam, and the terminal device further communicates with a second network device through a main beam, the sending, by the network device, the indication information to the terminal device includes: when the main beam is blocked, sending, by the first network device, the indication information to the terminal device through the auxiliary beam, wherein the indication information is used to instruct the terminal device to use the auxiliary beam to perform uplink transmission.

In connection with the second aspect, in some implementations of the second aspect, the network device is a first network device, the sending, by the network device, the indication information to the terminal device includes: sending, by the first network device, the indication information to the terminal device, the indication information is used to instruct the terminal device to switch to a second network device and perform uplink transmission with the second network device based on the beam corresponding to the at least one uplink transmission channel.

In connection with the second aspect, in some implementations of the second aspect, the uplink transmission channels of the terminal device include a first uplink transmission channel and a second uplink transmission channel, wherein the first uplink transmission channel is a physical uplink control channel, PUCCH, and the second uplink transmission channel is a physical uplink shared channel, PUSCH.

In connection with the second aspect, in some implementations of the second aspect, the indication information is specific indication information for a terminal device, or the indication information is specific indication information for a group of terminal devices.

In connection with the second aspect, in some implementations of the second aspect, the indication information is sent by the network device through downlink control information, DCI.

In a third aspect, a terminal device is provided, which includes units for performing the method of the first aspect.

In a fourth aspect, a network device is provided, which includes units for performing the method of the second aspect.

In a fifth aspect, a terminal device is provided, which includes a memory, a processor and a transceiver, wherein the memory is used for storing programs and the processor is used for executing programs, and when the programs are executed, the processor executes the method in the first aspect based on the transceiver.

In a sixth aspect, a network device is provided, which includes a memory, a processor and a transceiver, wherein the memory is used for storing programs and the processor is used for executing programs, and when the programs are executed, the processor executes the method in the second aspect based on the transceiver.

In a seventh aspect, a computer readable medium is provided, which stores program codes for execution by a terminal device, wherein the program codes includes instructions for executing the method in the first aspect.

In an eighth aspect, a computer readable medium is provided, which stores program codes for execution by a network device, wherein the program codes includes instructions for performing the method in the second aspect.

DETAILED DESCRIPTION

Technical solutions in the implementations of the present disclosure will be described clearly and completely in the following with reference to drawings in the implementations of the present disclosure.

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS) system, a New Radio Access Technology (NR), and 5G.

It should also be understood that in the implementations of the present disclosure, terminal devices may include, but is not limited to, a mobile station (MS), a mobile terminal, a mobile telephone, a User Equipment (UE), a handset, and a portable equipment, etc., and a terminal device may communicate with one or more core networks via a radio access network (RAN). For example, the terminal device may be a mobile phone (or referred to as a "cellular" phone), or a computer with wireless communication function, etc., or the terminal device may be a portable mobile apparatus, a pocket-sized mobile apparatus, a handheld mobile apparatus, a mobile apparatus with a built-in computer, or a vehicle-mounted mobile apparatus.

In the implementations of the present disclosure, a network device may be an access network device, such as a base station, a transmit and receive point (TRP) or an access point, and the base station may be a base transceiver station (BTS) in GSM or CDMA, a base station (NodeB) in WCDMA, an evolved node B (eNB or e-NodeB) in LTE, or a base station (gNB) of NR or 5G. The implementations of the present disclosure are not specifically limited to this.

It should be understood that a beam in an implementation of the present disclosure may also be referred to as a beam-formed signal. In the following description, a beam is referred to as an example.

In order to avoid the failure of uplink transmission caused by a blocked beam, in implementations of the disclosure, beams corresponding to uplink transmission channels of a terminal device are indicated or configured by a network device, so that flexible adjustment of the beams corresponding to the uplink transmission channels of the terminal device can be realized. An implementation of the present disclosure will be described in detail below with reference to FIG. 1.

Figure 1:
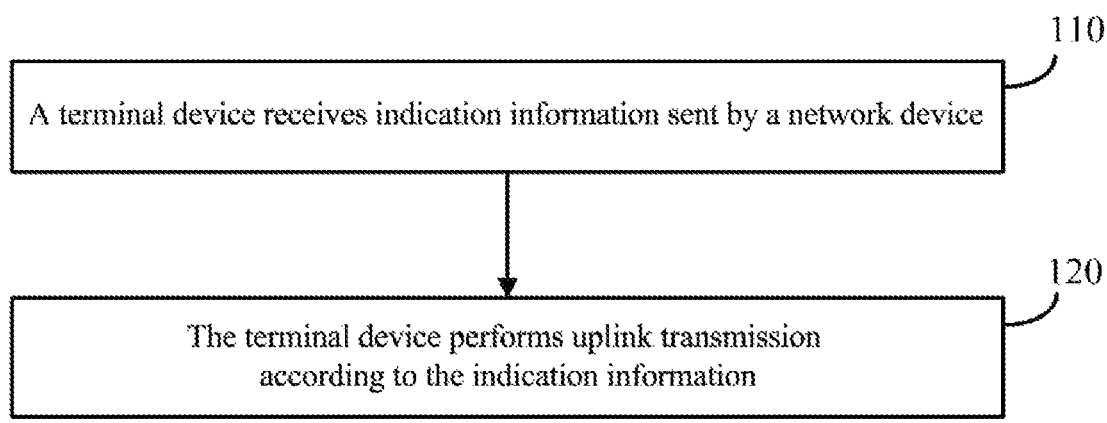
FIG. 1 is a schematic flowchart of an uplink transmission method according to an implementation of the present disclosure.

FIG. 1 is a schematic flowchart of an uplink transmission method according to an implementation of the present disclosure. The method of FIG. 1 includes acts 110 and 120.

In 110, a terminal device receives indication information sent by a network device, and the indication information is used for indicating a beam corresponding to at least one uplink transmission channel of the terminal device, wherein a beam corresponding to each uplink transmission channel is used for transmitting the each uplink transmission channel.

The implementation of the present disclosure does not specifically limit a manner of sending the indication information, for example, it may be sent through downlink control information (DCI) or other dedicated signaling.

In 120, the terminal device performs uplink transmission according to the indication information.

In the implementation of the disclosure, the network device sends indication information to the terminal device to indicate a beam corresponding to at least one uplink transmission channel of the terminal device, so that beams corresponding to uplink transmission channels of the terminal device are flexibly adjusted. For example, when a beam corresponding to an uplink transmission channel of the terminal device is blocked, the network device may allocate a new beam to the uplink transmission channel of the terminal device to solve the problem of the failure of uplink transmission caused by the blocked beam.

It should be noted that the indication information in the implementation of the present disclosure may also be referred to as configuration information.

It should also be noted that specific indication information for a terminal device may also be called as: indication information directed to a terminal device, or information independently configured for a terminal device, i.e., a piece of indication information independently indicating or independently configuring a terminal device. For example, if the terminal device is a UE, the specific indication information for the terminal device may be called as UE specific indication information. Similarly, specific indication information for a group of terminal devices may be called as indication information directed to a group of terminal devices, or information independently configured for a group of terminal devices, i.e., a piece of indication information independently indicating or independently configuring a group of terminal devices. For example, if the terminal devices are UEs, the specific indication information for a group of terminal device may be called as Group-UE specific indication information.

It should also be noted that the implementations of the present disclosure do not specifically limit types of uplink transmission channels of a terminal device, for example, they may include physical uplink control channel (PUCCH) and physical uplink shared channel (PUSCH), and may include other types of the transmission channels, such as physical random access channel (PRACH). In some implementations, the indication information of the implementations of the present disclosure may indicate or configure all uplink transmission channels of the terminal device. In other implementations, the indication information of the implementation of the present disclosure may indicate or configure all of other uplink channels of the terminal device except those channels dedicated for uplink measurements of different beams.

It should also be noted that the at least one uplink transmission channel mentioned above may be one transmission channel or multiple transmission channels. For example, the at least one transmission channel may be PUCCH or PUSCH, or the at least one transmission channel may include both PUCCH and PUSCH.

It should also be noted that the indication information is used to indicate a beam corresponding to at least one uplink transmission channel of the terminal device, but the implementation of the present disclosure does not specifically limit a corresponding relationship between the at least one uplink transmission channel and the beam. For example, the at least one uplink transmission channel may correspond to one beam; as another example, the at least one uplink transmission channel and the beam may be in a one-to-one correspondence, i.e., each uplink transmission channel corresponds to one beam. Taking the at least one uplink transmission channel include PUSCH and PUCCH as an example, PUSCH and PUCCH may correspond to one beam, which means that both PUSCH and PUCCH use the beam to perform uplink transmissions; alternatively, PUSCH and PUCCH may respectively correspond to one beam, and PUSCH and PUCCH use their respective corresponding beams to perform uplink transmissions.

Optionally, in some implementations, the indication information may include information of a target beam, and the indication information is specifically used to indicate that the at least one uplink transmission channel uses the target beam to perform uplink transmission. In other words, the at least one uplink transmission channel in the implementation of the present disclosure adopts a uniform configuration, i.e., uplink transmission is performed on the same target beam.

Further, in the implementation of the present disclosure, the at least one uplink transmission channel may include all uplink transmission channels of the terminal device (it may not include channels configured by the network device dedicated for uplink measurements of different beams). For example, the at least one uplink transmission channel may include both PUSCH and PUCCH. Since configurations of beams corresponding to different uplink transmission channels are the same, the implementation of the present disclosure performs unified configuration for beams corresponding to all uplink transmission channels through indication information, which is simple to implement and can improve the efficiency of configuration.

Optionally, in some implementations, the information of the target beam includes a beam identity of the target beam.

Optionally, in some implementations, the information of the target beam includes a beam index of the target beam, which may be used to indicate which beam in a pre-configured beam group is the target beam, or the beam index of the target beam may be used to indicate a position or order of the target beam in a pre-configured beam group. The beam group herein may be a beam group configured by the network device to the terminal device through a high-level signaling, or may be a beam group configured by the network device for the terminal device in other ways.

Optionally, in some implementations, the indication information may include information of a beam corresponding to each uplink transmission channel in the at least one uplink transmission channel. In other words, the indication information may include information of a beam one-to-one corresponding to the at least one uplink transmission channel. That is, in the implementation of the present disclosure, different uplink transmission channels may correspond to different beams, so that the flexibility of uplink transmission may be improved. When this implementation mode is adopted, the indication information of the implementation of the present disclosure may carry information of the beam respectively corresponding to each uplink transmission channel.

Further, in the implementation of the present disclosure, the at least one uplink transmission channel may include all uplink transmission channels of the terminal device (it may not include channels configured by the network device dedicated for uplink measurements of different beams), for example, both PUSCH and PUCCH may be included by the at least one uplink transmission channel, then the indication information may carry information of a beam corresponding to PUSCH, and may also carry information of a beam corresponding to PUCCH.

Optionally, in some implementations, the information of the beam corresponding to each uplink transmission channel in the at least one uplink transmission channel includes a beam identity of the beam corresponding to the each uplink transmission channel.

Specifically, assuming that at least one uplink transmission channel includes K uplink transmission channels, K≥1, then the indication information may include the following information: [uplink transmission channel 1, beam identity 1], [uplink transmission channel 2, beam identity 2] . . . [uplink transmission channel K, beam identity K].

Optionally, in some implementations, the information of the beam corresponding to each uplink transmission channel in the at least one uplink transmission channel includes a beam index of the beam corresponding to the each uplink transmission channel. The beam index of the beam corresponding to each uplink transmission channel is used to indicate which beam in a pre-configured beam group the beam corresponding to the each uplink transmission channel is, or the beam index of the beam corresponding to each uplink transmission channel may be used to indicate a position or order of the beam corresponding to the each uplink transmission channel in a pre-configured beam group. The beam group herein may be a beam group configured by the network device to the terminal device through a high-level signaling, or may be a beam group configured by the network device for the terminal device in other ways.

Specifically, assuming that the at least one uplink transmission channel includes M uplink transmission channels, M≥1, then the indication information may include the following correspondence information: [uplink transmission channel 1, beam index 1], [uplink transmission channel 2, beam index 2] . . . [uplink transmission channel M, beam index M].

Optionally, in some implementations, the at least one uplink transmission channel is a part of uplink transmission channels of the terminal device, and beams corresponding to remaining uplink transmission channels of the terminal device except the part of the uplink transmission channels remain unchanged.

In the implementation of the disclosure, the indication information sent by the network device may only configure the beams corresponding to a part of the uplink transmission channels of the terminal device, and beams corresponding to uplink transmission channels of the terminal device that are not configured may remain unchanged. That is, the network device does not need to configure beams corresponding to all uplink transmission channels of the terminal device every time, but may select and configure beams corresponding to some uplink transmission channels according to actual needs, thus improving the flexibility of the network configuration.

Optionally, in some implementations, act 120 may include: determining, by the terminal device, beams corresponding to various uplink transmission channels of the terminal device according to the indication information; and performing, by the terminal device, the uplink transmission according to the beams corresponding to various uplink transmission channels of the terminal device.

Optionally, in some implementations, the uplink transmission channels of the terminal device may include a first uplink transmission channel and a second uplink transmission channel, and the first uplink transmission channel and the second uplink transmission channel correspond to different beams, the performing, by the terminal device, the uplink transmission according to the beams corresponding to various uplink transmission channels of the terminal device may include: when time domain resources occupied by the first uplink transmission channel and the second uplink transmission channel overlap (or the first uplink transmission channel and the second uplink transmission channel overlap in time domain), if transmission power of the terminal device is insufficient, performing, by the terminal device, a puncturing processing on the first uplink transmission channel or the second uplink transmission channel, or adjusting, by the terminal device, transmission power of the first uplink transmission channel or the second uplink transmission channel.

Specifically, the implementation of the present disclosure may be applied to a scenario where the terminal device always uses the beams corresponding to various uplink transmission channels to transmit the various uplink transmission channels. Taking the first uplink transmission channel is PUCCH and the second uplink transmission channel is PUSCH as an example, if time domain resources currently occupied by PUCCH and PUSCH to be transmitted overlap, a puncturing processing may be performed on PUSCH, for example, some or all of the resources (such as resource elements, REs) in the time domain in PUSCH overlapped with PUCCH may be punctured, thereby an overlapping degree of the PUCCH and the PUSCH is reduced, thereby alleviating the issue that the transmission power is insufficient due to simultaneous transmission of the PUCCH and PUSCH. Or, the transmission power of PUSCH may be reduced in the overlapping part of the time domain, and full power transmission of PUCCH may be preferentially guaranteed, while PUSCH may be transmitted with remaining power.

Optionally, in some implementations, the uplink transmission channels of the terminal device include a first uplink transmission channel and a second uplink transmission channel, and the first uplink transmission channel and the second uplink transmission channel correspond to different beams. Performing, by the terminal device, the uplink transmission according to the beams corresponding to various uplink transmission channels of the terminal device may include: when time domain resources occupied by the first uplink transmission channel and the second uplink transmission channel overlap, or an overlapping degree of the time domain resources occupied by the first uplink transmission channel and the second uplink transmission channel is greater than a pre-determined threshold, transmitting, by the terminal device, the first uplink transmission channel through a beam corresponding to the second uplink transmission channel.

Specifically, taking the first uplink transmission channel is PUCCH and the second uplink transmission channel is PUSCH as an example, in some implementations, PUSCH and PUCCH may be transmitted using a beam corresponding to PUSCH when the time domain resources occupied by PUCCH and PUSCH overlap or an overlapping degree of the time domain resources occupied by PUCCH and PUSCH is greater than a pre-determined threshold.

In other implementations, when the time domain resources occupied by PUCCH and PUSCH overlap, or an overlapping degree of the time domain resources occupied by PUCCH and PUSCH is greater than a pre-determined threshold, PUSCH may be transmitted using a beam corresponding to PUCCH.

The implementation of the disclosure uses the same beam to transmit the first uplink transmission channel and the second uplink transmission channel, so that main energy can be concentrated in the same beam, and the overall performance of uplink transmission may be improved.

Optionally, in some implementations, performing, by the terminal device, the uplink transmission according to the beams corresponding to various uplink transmission channels of the terminal device may further include: when the time domain resources occupied by the first uplink transmission channel and the second uplink transmission channel do not overlap, or the overlapping degree of the time domain resources occupied by the first uplink transmission channel and the second uplink transmission channel is less than a pre-determined threshold, transmitting, by the terminal device, the first uplink transmission channel through a beam corresponding to the first uplink transmission channel.

Optionally, in some implementations, the network device is a first network device, the first network device communicates with the terminal device through a downlink auxiliary beam (and a corresponding uplink auxiliary beam), and the terminal device also communicates with a second network device through a downlink main beam (and a corresponding uplink main beam). Act 110 may include: when the uplink and downlink main beams are blocked, receiving, by the terminal device, indication information sent by the first network device through the auxiliary beam, wherein the indication information is used to instruct the terminal device to use the uplink auxiliary beam to perform uplink transmission.

Communication between the first network device and the terminal through the auxiliary beam may refer to downlink transmission between the first network device and the terminal through the auxiliary beam.

Communication between the terminal device and the second network device through the main beam may refer to uplink and downlink transmission between the terminal device and the second network device.

For example, assuming that the second network device is a Transmit and Receive Point (TRP) 1 and the first network device is a TRP 2, the terminal device communicates with TRP 1 and TRP 2 at the same time, and a uplink/downlink main beam (or a uplink/downlink main active beam) is used for uplink and downlink transmission between TRP 1 and the terminal device, and the TRP 2 use a downlink auxiliary beam (or a downlink auxiliary active beam) for downlink transmission with the terminal device. Assuming that at some moment, the uplink main beam between the terminal device and TRP 1 is blocked, TRP 2 may instruct, through DCI, the terminal device to use a corresponding uplink auxiliary beam for uplink transmission, that is, instruct the terminal device to switch the uplink transmission to the auxiliary beam.

In the implementation of the disclosure, when the uplink main beam is blocked, the terminal device may continue to use the uplink auxiliary beam for uplink transmission according to the instruction, thus improving the flexibility and reliability of a communication system.

Optionally, in some implementations, the network device is a first network device, and act 110 may include: receiving, by the terminal device, the indication information sent by the first network device, wherein the indication information is used to instruct the terminal device to switch to a second network device and perform uplink transmission with the second network device based on the beam corresponding to the at least one uplink transmission channel.

For example, assuming that the first network device is TRP 1 and the second network device is TRP 2, and the terminal device and TRP 1 perform uplink and downlink transmission through corresponding beams. With the movement of the terminal device, path loss between the terminal device and TRP 2 is smaller and/or a beam-formed gain between the terminal device and TRP 2 is larger. At this time, TRP 1 may send the indication information to the terminal device, select an appropriate beam for the terminal device (an uplink transmission beam corresponding to TRP 2), and then switch the uplink transmission between the terminal device and TRP 1 to TRP 2. Downlink services of the terminal device may also be switched to TRP 2, but if terminal devices served by TRP 2 have many downlink services (or the load of downlink services is heavy), TRP 1 continues to perform downlink transmission with the terminal device and only switches the uplink transmission to TRP 2.

Optionally, in some implementations, the uplink transmission channels of the terminal device include a first uplink transmission channel and a second uplink transmission channel, the first uplink transmission channel is PUCCH and the second uplink transmission channel is PUSCH.

Optionally, in some implementations, act 120 may include: determining, by the terminal device, beams corresponding to various uplink transmission channels of the terminal device according to the indication information; and performing, by the terminal device, the uplink transmission by using the beams corresponding to various uplink transmission channels of the terminal device.

The uplink transmission method according to the implementation of the present disclosure has been described in detail above from the perspective of a terminal device in conjunction with FIG. 1, and an uplink transmission method according to an implementation of the present disclosure will be described in detail below from the perspective of a network device in conjunction with FIG. 2. It should be understood that the description from the network device side and the description from the terminal device side correspond to each other, and similar descriptions may be found above, and in order to avoid repetition, they will not be described here.

Figure 2:
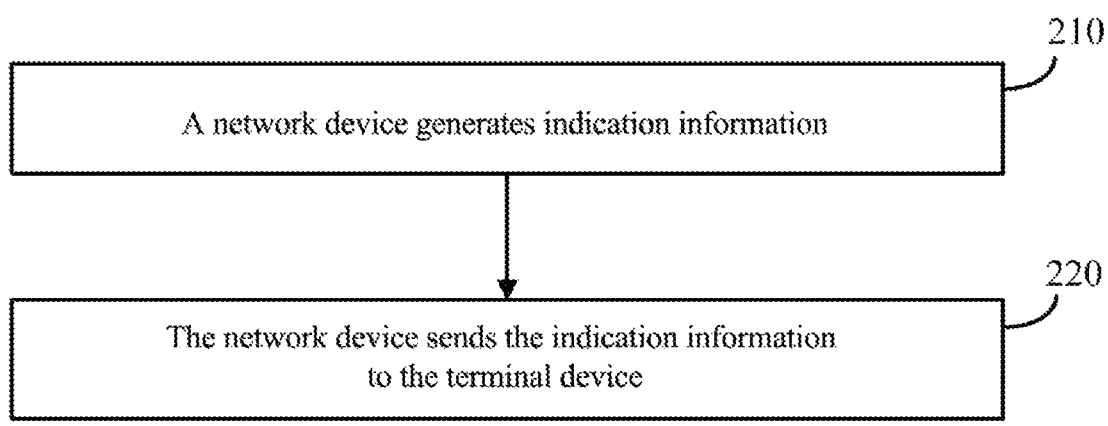
FIG. 2 is a schematic flowchart of an uplink transmission method according to an implementation of the present disclosure.

FIG. 2 is a schematic flowchart of an uplink transmission method according to an implementation of the present disclosure. The method of FIG. 2 includes acts 210 and 220.

In 210, a network device generates indication information for indicating a beam corresponding to at least one uplink transmission channel of a terminal device, wherein a beam corresponding to each uplink transmission channel is used for transmitting the each uplink transmission channel.

In 220, the network device sends the indication information to the terminal device.

In the implementation of the disclosure, the network device sends indication information to the terminal device to indicate the beam corresponding to at least one uplink transmission channel of the terminal device, so that beams corresponding to uplink transmission channels of the terminal device may be flexibly adjusted. For example, when a beam corresponding to an uplink transmission channel of the terminal device is blocked, the network device may allocate a new beam to the uplink transmission channel of the terminal device, thereby solving the problem of the failure of uplink transmission caused by the blocked beam.

Optionally, in some implementations, the indication information includes information of a target beam, and the indication information is specifically used to indicate that each uplink transmission channel in the at least one uplink transmission channel uniformly uses the target beam for uplink transmission.

Optionally, in some implementations, the information of the target beam includes a beam identity of the target beam.

Optionally, in some implementations, the information of the target beam includes a beam index of the target beam, and the beam index of the target beam is used to indicate which beam in a pre-configured beam group is the target beam.

Optionally, in some implementations, the indication information includes information of a beam corresponding to each uplink transmission channel in the at least one uplink transmission channel.

Optionally, in some implementations, the information of the beam corresponding to each uplink transmission channel includes a beam identity of the beam corresponding to the each uplink transmission channel.

Optionally, in some implementations, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

Optionally, in some implementations, the beam group is a beam group configured by the network device to the terminal device through a high-level signaling.

Optionally, in some implementations, the at least one uplink transmission channel is a part of uplink transmission channels of the terminal device, and beams corresponding to remaining uplink transmission channels of the terminal device except the part of the uplink transmission channels remain unchanged.

Optionally, in some implementations, the uplink transmission channels of the terminal device include a first uplink transmission channel and a second uplink transmission channel, and the first uplink transmission channel and the second uplink transmission channel correspond to different beams. The method of FIG. 2 may further include: when time domain resources occupied by the first uplink transmission channel and the second uplink transmission channel overlap, or an overlapping degree of the time domain resources occupied by the first uplink transmission channel and the second uplink transmission channel is greater than a pre-determined threshold, receiving, by the network device, the first uplink transmission channel through a beam corresponding to the second uplink transmission channel.

Optionally, in some implementations, the method of FIG. 2 may further include: when the time domain resources occupied by the first uplink transmission channel and the second uplink transmission channel do not overlap, or the overlapping degree of the time domain resources occupied by the first uplink transmission channel and the second uplink transmission channel is less than a pre-determined threshold, receiving, by the network device, the first uplink transmission channel through a beam corresponding to the first uplink transmission channel.

Optionally, in some implementations, the network device is a first network device, the first network device communicates with the terminal device through an auxiliary beam, and the terminal device also communicates with a second network device through a main beam. Act 220 may include: when the main beam is blocked, sending, by the first network device, the indication information to the terminal device through the auxiliary beam, wherein the indication information is used to instruct the terminal device to use the auxiliary beam to perform uplink transmission.

Optionally, in some implementations, the network device is a first network device, and act 220 may include: sending, by the first network device, the indication information to the terminal device, wherein the indication information is used to instruct the terminal device to switch to a second network device and perform uplink transmission with the second network device based on the beam corresponding to the at least one uplink transmission channel.

Optionally, in some implementations, the uplink transmission channels of the terminal device include a first uplink transmission channel and a second uplink transmission channel, wherein the first uplink transmission channel is PUCCH and the second uplink transmission channel is PUSCH.

Optionally, in some implementations, the indication information is specific indication information for a terminal device, or the indication information is specific indication information for a group of terminal devices.

Optionally, in some implementations, the indication information is sent by the network device through downlink control information, DCI.

Method implementations of the present disclosure have been described in detail above with reference to FIGS. 1 and 2, and the apparatus implementations of the present disclosure will be described in detail below with reference to FIGS. 3 to 6. It should be understood that the apparatus implementations and the method implementations correspond to each other, and similar descriptions may refer to the method implementations.

Figure 3:
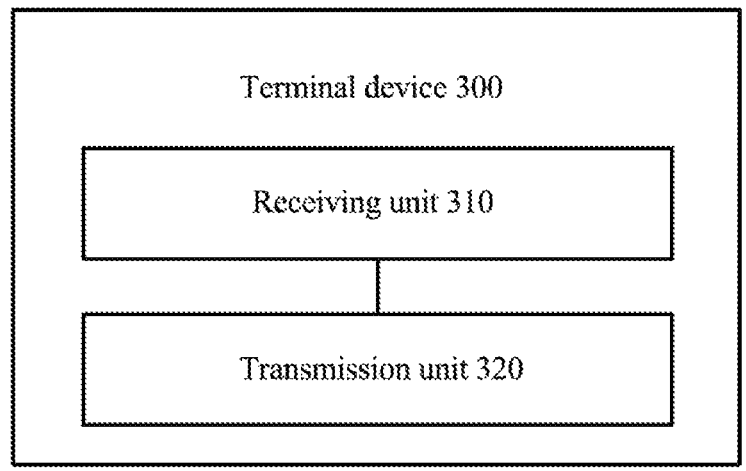
FIG. 3 is a schematic block diagram of a terminal device according to an implementation of the present disclosure.

FIG. 3 is a schematic block diagram of a terminal device according to an implementation of the present disclosure. As shown in FIG. 3, the terminal device 300 includes a determining unit 310 and a transmission unit 320.

The receiving unit 310 is used for receiving indication information sent by a network device, the indication information being used for indicating a beam corresponding to at least one uplink transmission channel of the terminal device 300, wherein a beam corresponding to each uplink transmission channel is used for transmitting the each uplink transmission channel.

The transmission unit 320 is used for performing uplink transmission according to the indication information.

Optionally, in some implementations, the indication information includes information of a target beam, and the indication information is specifically used to indicate that the at least one uplink transmission channel uses the target beam for uplink transmission.

Optionally, in some implementations, the information of the target beam includes a beam identity of the target beam.

Optionally, in some implementations, the information of the target beam includes a beam index of the target beam, and the beam index of the target beam is used to indicate which beam in a pre-configured beam group is the target beam.

Optionally, in some implementations, the indication information includes information of a beam corresponding to each uplink transmission channel in the at least one uplink transmission channel.

Optionally, in some implementations, the information of the beam corresponding to each uplink transmission channel includes a beam identity of the beam corresponding to the each uplink transmission channel.

Optionally, in some implementations, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

Optionally, in some implementations, the beam group is a beam group configured by the network device to the terminal device 300 through a high-level signaling.

Optionally, in some implementations, the at least one uplink transmission channel is a part of uplink transmission channels of the terminal device 300, and beams corresponding to remaining uplink transmission channels of the terminal device 300 except the part of the uplink transmission channels remain unchanged.

Optionally, in some implementations, the transmission unit 320 is specifically used for determining beams corresponding to various uplink transmission channels of the terminal device 300 according to the indication information; and performing the uplink transmission according to the beams corresponding to the various uplink transmission channels of the terminal device 300.

Optionally, in some implementations, the uplink transmission channels of the terminal device 300 includes a first uplink transmission channel and a second uplink transmission channel, and the first uplink transmission channel and the second uplink transmission channel correspond to different beams, and the transmission unit 320 is specifically used for performing a puncturing processing on the first uplink transmission channel or the second uplink transmission channel or adjusting transmission power of the first uplink transmission channel or the second uplink transmission channel if transmission power of the terminal device 300 is insufficient when time domain resources occupied by the first uplink transmission channel and the second uplink transmission channel overlap.

Optionally, in some implementations, the uplink transmission channels of the terminal device 300 includes a first uplink transmission channel and a second uplink transmission channel, and the first uplink transmission channel and the second uplink transmission channel correspond to different beams, and the transmission unit 320 is specifically used for transmitting the first uplink transmission channel through a beam corresponding to the second uplink transmission channel when time domain resources occupied by the first uplink transmission channel and the second uplink transmission channel overlap, or an overlapping degree of the time domain resources occupied by the first uplink transmission channel and the second uplink transmission channel is greater than a pre-determined threshold.

Optionally, in some implementations, the transmission unit 320 is further used for transmitting the first uplink transmission channel through a beam corresponding to the first uplink transmission channel when the time domain resources occupied by the first uplink transmission channel and the second uplink transmission channel do not overlap or the overlapping degree of the time domain resources occupied by the first uplink transmission channel and the second uplink transmission channel is less than a pre-determined threshold.

Optionally, in some implementations, the network device is a first network device, the first network device communicates with the terminal device 300 through an auxiliary beam, the terminal device 300 also communicates with a second network device through a main beam, and the receiving unit 310 is specifically used for receiving the indication information sent by the first network device through the auxiliary beam when the main beam is blocked, and the indication information is used to instruct the terminal device 300 to use the auxiliary beam to perform uplink transmission.

Optionally, in some implementations, the network device is a first network device, and the receiving unit 310 is specifically used for receiving the indication information sent by the first network device, and the indication information is used to instruct the terminal device 300 to switch to a second network device and perform uplink transmission with the second network device based on the beam corresponding to the at least one uplink transmission channel.

Optionally, in some implementations, the uplink transmission channels of the terminal device 300 include a first uplink transmission channel and a second uplink transmission channel, wherein the first uplink transmission channel is a physical uplink control channel, PUCCH, and the second uplink transmission channel is a physical uplink shared channel, PUSCH.

Optionally, in some implementations, the indication information is specific indication information for the terminal device 300, or the indication information is specific indication information for a group of terminal devices 300.

Optionally, in some implementations, the indication information is sent by the network device through downlink control information, DCI.

Figure 4:
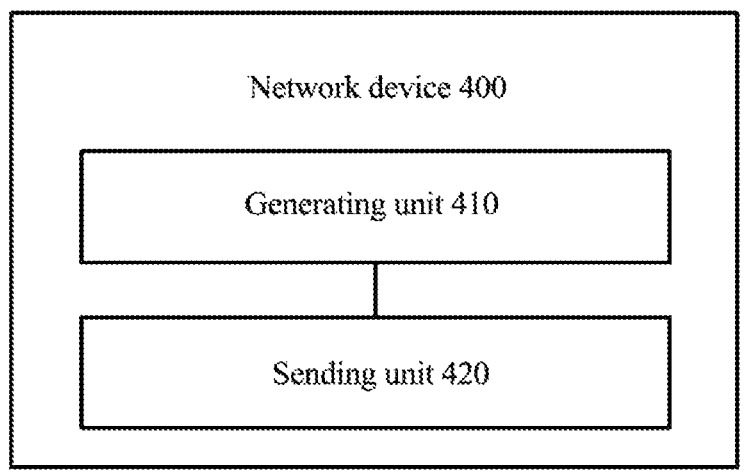
FIG. 4 is a schematic block diagram of a network device according to an implementation of the present disclosure.

FIG. 4 is a schematic block diagram of a network device according to an implementation of the present disclosure. The network device 400 of FIG. 4 includes a generating unit 410 and a sending unit 420.

The generating unit 410 is used for generating indication information for indicating a beam corresponding to at least one uplink transmission channel of a terminal device, wherein a beam corresponding to each uplink transmission channel is used for transmitting the each uplink transmission channel.

The sending unit 420 is used for sending the indication information to the terminal device.

Optionally, in some implementations, the indication information includes information of a target beam, and the indication information is specifically used for indicating that the at least one uplink transmission channel uses the target beam for uplink transmission.

Optionally, in some implementations, the information of the target beam includes a beam identity of the target beam.

Optionally, in some implementations, the information of the target beam includes a beam index of the target beam, and the beam index of the target beam is used to indicate which beam in a pre-configured beam group is the target beam.

Optionally, in some implementations, the indication information includes information of a beam corresponding to each uplink transmission channel in the at least one uplink transmission channel.

Optionally, in some implementations, the information of the beam corresponding to each uplink transmission channel includes a beam identity of the beam corresponding to the each uplink transmission channel.

Optionally, in some implementations, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

Optionally, in some implementations, the beam group is a beam group configured to the terminal device by the network device 400 through a high-level signaling.

Optionally, in some implementations, the at least one uplink transmission channel is a part of uplink transmission channels of the terminal device, and beams corresponding to remaining uplink transmission channels of the terminal device except the part of the uplink transmission channels remain unchanged.

Optionally, in some implementations, the uplink transmission channels of the terminal device include a first uplink transmission channel and a second uplink transmission channel, and the first uplink transmission channel and the second uplink transmission channel correspond to different beams, and the network device 400 further includes a first receiving unit used for receiving the first uplink transmission channel through a beam corresponding to the second uplink transmission channel when time domain resources occupied by the first uplink transmission channel and the second uplink transmission channel overlap or an overlapping degree of the time domain resources occupied by the first uplink transmission channel and the second uplink transmission channel is greater than a pre-determined threshold.

Optionally, in some implementations, the network device 400 further includes a second receiving unit used for receiving the first uplink transmission channel through a beam corresponding to the first uplink transmission channel when the time domain resources occupied by the first uplink transmission channel and the second uplink transmission channel do not overlap or the overlapping degree of the time domain resources occupied by the first uplink transmission channel and the second uplink transmission channel is less than a pre-determined threshold.

Optionally, in some implementations, the network device 400 is a first network device, the first network device communicates with the terminal device through an auxiliary beam, the terminal device also communicates with the second network device through a main beam, and the sending unit 420 is specifically used for sending the indication information to the terminal device through the auxiliary beam when the main beam is blocked, and the indication information is used to instruct the terminal device to use the auxiliary beam to perform uplink transmission.

Optionally, in some implementations, the network device 400 is a first network device, and the sending unit 420 is specifically used for sending the indication information to the terminal device, and the indication information is used to instruct the terminal device to switch to a second network device and perform uplink transmission with the second network device based on the beam corresponding to the at least one uplink transmission channel.

Optionally, in some implementations, the uplink transmission channels of the terminal device include a first uplink transmission channel and a second uplink transmission channel, wherein the first uplink transmission channel is a physical uplink control channel, PUCCH and the second uplink transmission channel is a physical uplink shared channel, PUSCH.

Optionally, in some implementations, the indication information is specific indication information for a terminal device, or the indication information is specific indication information for a group of terminal devices.

Optionally, in some implementations, the indication information is sent by the network device 400 through downlink control information, DCI.

Figure 5:
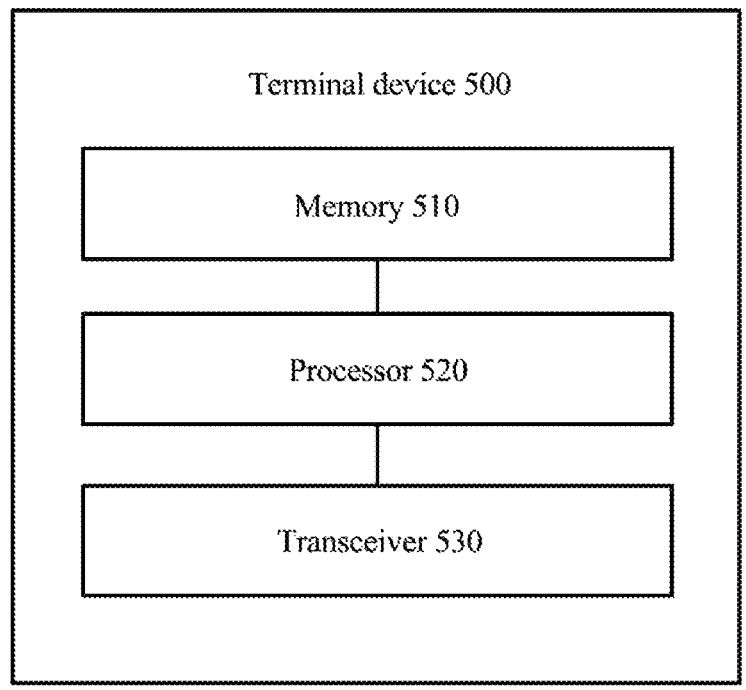
FIG. 5 is a schematic block diagram of a terminal device according to an implementation of the present disclosure.

FIG. 5 is a schematic block diagram of a terminal device according to an implementation of the present disclosure.

The terminal device 500 of FIG. 5 includes a memory 510, a processor 520 and a transceiver 530, wherein the memory 510 is used for storing programs and the processor 520 is used for executing programs. When the programs are executed, the processor 520 receives indication information sent by a network device through the transceiver 530 for indicating a beam corresponding to at least one uplink transmission channel of the terminal device 500, wherein a beam corresponding to each uplink transmission channel is used for transmitting the each uplink transmission channel; and uplink transmission is performed according to the indication information.

Optionally, in some implementations, the indication information includes information of a target beam, and the indication information is specifically used to indicate that the at least one uplink transmission channel uses the target beam for uplink transmission.

Optionally, in some implementations, the information of the target beam includes a beam identity of the target beam.

Optionally, in some implementations, the information of the target beam includes a beam index of the target beam, and the beam index of the target beam is used to indicate which beam in a pre-configured beam group is the target beam.

Optionally, in some implementations, the indication information includes information of a beam corresponding to each uplink transmission channel in the at least one uplink transmission channel.

Optionally, in some implementations, the information of the beam corresponding to each uplink transmission channel includes a beam identity of the beam corresponding to the each uplink transmission channel.

Optionally, in some implementations, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

Optionally, in some implementations, the beam group is a beam group configured by the network device to the terminal device 500 through a high-level signaling.

Optionally, in some implementations, the at least one uplink transmission channel is a part of uplink transmission channels of the terminal device 500, and beams corresponding to remaining uplink transmission channels of the terminal device 500 except the part of the uplink transmission channels remain unchanged.

Optionally, in some implementations, the processor 520 is specifically used for determining the beams corresponding to various uplink transmission channels of the terminal device 500 according to the indication information; and the uplink transmission is performed through the transceiver 530 according to the beams corresponding to the various uplink transmission channels of the terminal device 500.

Optionally, in some implementations, the uplink transmission channels of the terminal device 500 include a first uplink transmission channel and a second uplink transmission channel, and the first uplink transmission channel and the second uplink transmission channel correspond to different beams, and the processor 520 is specifically used for performing a puncturing processing on the first uplink transmission channel or the second uplink transmission channel or adjusting transmission power of the first uplink transmission channel or the second uplink transmission channel if transmission power of the terminal device 500 is insufficient when time domain resources occupied by the first uplink transmission channel and the second uplink transmission channel overlap.

Optionally, in some implementations, the uplink transmission channels of the terminal device 500 include a first uplink transmission channel and a second uplink transmission channel, and the first uplink transmission channel and the second uplink transmission channel correspond to different beams, and the processor 520 is specifically used for transmitting, through the transceiver 530, the first uplink transmission channel in a beam corresponding to the second uplink transmission channel when time domain resources occupied by the first uplink transmission channel and the second uplink transmission channel overlap or an overlapping degree of the time domain resources occupied by the first uplink transmission channel and the second uplink transmission channel is greater than a pre-determined threshold.

Optionally, in some implementations, the processor 520 is further used for transmitting, through the transceiver 530, the first uplink transmission channel in a beam corresponding to the first uplink transmission channel when the time domain resources occupied by the first uplink transmission channel and the second uplink transmission channel do not overlap or the overlapping degree of the time domain resources occupied by the first uplink transmission channel and the second uplink transmission channel is less than a pre-determined threshold.

Optionally, in some implementations, the network device is a first network device, the first network device communicates with the terminal device 500 through an auxiliary beam, the terminal device 500 also communicates with a second network device through a main beam, and the processor 520 is specifically used for receiving, through the transceiver 530, the indication information sent by the first network device through the auxiliary beam when the main beam is blocked, and the indication information is used to instruct the terminal device 500 to use the auxiliary beam to perform uplink transmission.

Optionally, in some implementations, the network device is a first network device, and the processor 520 is specifically used for receiving, through the transceiver 530, the indication information sent by the first network device, and the indication information is used to instruct the terminal device 500 to switch to a second network device and perform uplink transmission with the second network device based on the beam corresponding to the at least one uplink transmission channel.

Optionally, in some implementations, the uplink transmission channels of the terminal device 500 include a first uplink transmission channel and a second uplink transmission channel, wherein the first uplink transmission channel is a physical uplink control channel, PUCCH and the second uplink transmission channel is a physical uplink shared channel, PUSCH.

Optionally, in some implementations, the indication information is specific indication information for the terminal device 500, or the indication information is specific indication information for a group of terminal devices 500.

Optionally, in some implementations, the indication information is sent by the network device through downlink control information, DCI.

Figure 6:
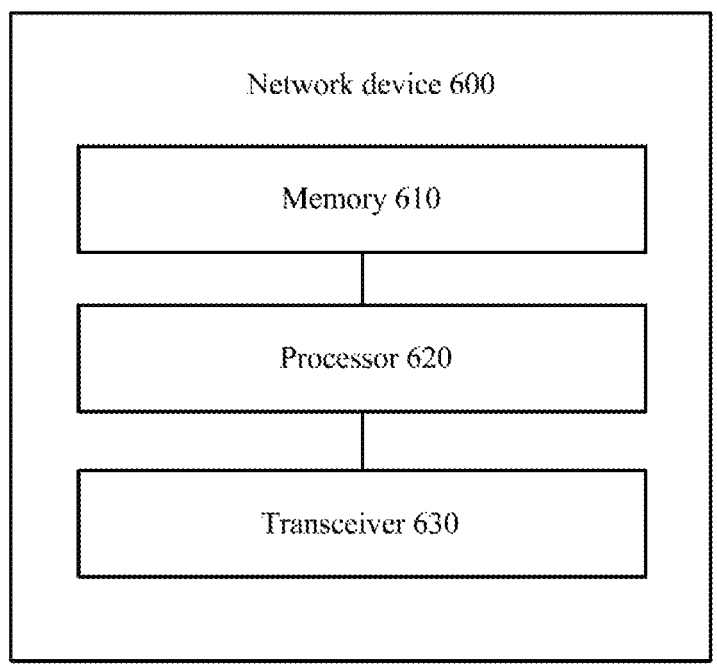
FIG. 6 is a schematic block diagram of a network device according to an implementation of the present disclosure.

FIG. 6 is a schematic block diagram of a network device according to an implementation of the present disclosure. The network device 600 of FIG. 6 includes a memory 610, a processor 620 and a transceiver 630, wherein the memory 610 is used for storing programs and the processor 620 is used for executing programs. When the programs are executed, the processor 620 is used for generating indication information for indicating a beam corresponding to at least one uplink transmission channel of the terminal device, wherein a beam corresponding to each uplink transmission channel is used for transmitting the each uplink transmission channel; and the transceiver 630 is used for sending the indication information to the terminal device.

Optionally, in some implementations, the indication information includes information of a target beam, and the indication information is specifically used for indicating that the at least one uplink transmission channel uses the target beam for uplink transmission.

Optionally, in some implementations, the information of the target beam includes a beam identity of the target beam.

Optionally, in some implementations, the information of the target beam includes a beam index of the target beam, and the beam index of the target beam is used to indicate which beam in a pre-configured beam group is the target beam.

Optionally, in some implementations, the indication information includes information of a beam corresponding to each uplink transmission channel in the at least one uplink transmission channel.

Optionally, in some implementations, the information of the beam corresponding to each uplink transmission channel includes a beam identity of the beam corresponding to the each uplink transmission channel.

Optionally, in some implementations, the information of the beam corresponding to each uplink transmission channel includes a beam index of the beam corresponding to the each uplink transmission channel, and the beam index of the beam corresponding to the each uplink transmission channel is used to indicate which beam in a pre-configured beam group is the beam corresponding to the each uplink transmission channel.

Optionally, in some implementations, the beam group is a beam group configured to the terminal device by the network device 600 through a high-level signaling.

Optionally, in some implementations, the at least one uplink transmission channel is a part of uplink transmission channels of the terminal device, and beams corresponding to remaining uplink transmission channels of the terminal device except the part of the uplink transmission channels remain unchanged.

Optionally, in some implementations, the uplink transmission channels of the terminal device include a first uplink transmission channel and a second uplink transmission channel, and the first uplink transmission channel and the second uplink transmission channel correspond to different beams, and the transceiver 630 is further used for receiving the first uplink transmission channel through a beam corresponding to the second uplink transmission channel when time domain resources occupied by the first uplink transmission channel and the second uplink transmission channel overlap or an overlapping degree of the time domain resources occupied by the first uplink transmission channel and the second uplink transmission channel is greater than a pre-determined threshold.

Optionally, in some implementations, the transceiver 630 is further used for receiving the first uplink transmission channel through a beam corresponding to the first uplink transmission channel when the time domain resources occupied by the first uplink transmission channel and the second uplink transmission channel do not overlap or the overlapping degree of the time domain resources occupied by the first uplink transmission channel and the second uplink transmission channel is less than a pre-determined threshold.

Optionally, in some implementations, the network device 600 is a first network device, the first network device communicates with the terminal device through an auxiliary beam, the terminal device also communicates with a second network device through a main beam, and the transceiver 630 is specifically used for sending the indication information to the terminal device through the auxiliary beam when the main beam is blocked, and the indication information is used to instruct the terminal device to use the auxiliary beam to perform uplink transmission.

Optionally, in some implementations, the network device 600 is a first network device, and the transceiver 630 is further used for sending the indication information to the terminal device, and the indication information is used to instruct the terminal device to switch to a second network device and perform uplink transmission with the second network device based on the beam corresponding to the at least one uplink transmission channel.

Optionally, in some implementations, the uplink transmission channels of the terminal device include a first uplink transmission channel and a second uplink transmission channel, wherein the first uplink transmission channel is a physical uplink control channel, PUCCH and the second uplink transmission channel is a physical uplink shared channel, PUSCH.

Optionally, in some implementations, the indication information is specific indication information for a terminal device, or the indication information is specific indication information for a group of terminal devices.

Optionally, in some implementations, the indication information is sent by the network device 600 through the downlink control information, DCI.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units can be selected according to actual needs to achieve the purpose of the implementations.

In addition, various functional units in various implementations of the present disclosure may be integrated in one processing unit, or they may be physically present separately, or two or more units may be integrated in one unit.

The functions may be stored in a computer readable storage medium if implemented in the form of software functional units and sold or used as a separate product. Based on this understanding, the technical solution of the present disclosure, in essence, or the part contributing to the prior art, or the part of the technical solution, may be embodied in the form of a software product, and the computer software product is stored in a storage medium, including several instructions for causing a computer device (which may be a personal computer, a server, or a network device) to perform all or part of the acts of the method described in various implementations of the present disclosure. The aforementioned storage medium includes a U disk, a mobile hard disk, a read-only memory (ROM), a random access memory (RAM), a magnetic disk or an optical disk, or other medium capable of storing program codes.

What is claimed is:

1. A method for uplink transmission, comprising:
receiving, by a terminal device, indication information and a high-level signaling sent by a network device, wherein the indication information is used for indicating a beam corresponding to at least one uplink transmission channel of the terminal device, the beam corresponding to each uplink transmission channel is used for transmitting the each uplink transmission channel; wherein information of the beam corresponding to the each uplink transmission channel comprises a beam index of the beam corresponding to the each uplink transmission channel, and the beam index of the beam corresponding to the each uplink transmission channel is used to indicate which beam in a pre-configured beam group is the beam corresponding to the each uplink transmission channel; wherein the beam group is a beam group configured by the network device to the terminal device through the high-level signaling; and
performing, by the terminal device, uplink transmission according to the indication information and the high-level signaling,
wherein the indication information is specific indication information for a terminal device or specific indication information for a group of terminal devices,
wherein the at least one uplink transmission channel is a part of uplink transmission channels of the terminal device, and beams corresponding to remaining uplink transmission channels of the terminal device except the part of the uplink transmission channels remain unchanged,
wherein the uplink transmission channels of the terminal device comprise a first uplink transmission channel and a second uplink transmission channel, and the first uplink transmission channel and the second uplink transmission channel correspond to different beams, and
wherein performing, by the terminal device, the uplink transmission according to the beam corresponding to the each uplink transmission channel of the terminal device comprises:
when time domain resources occupied by the first uplink transmission channel and the second uplink transmission channel overlap, if transmission power of the terminal device is insufficient, performing, by the terminal device, a puncturing processing on the first uplink transmission channel or the second uplink transmission channel, or adjusting, by the terminal device, transmission power of the first uplink transmission channel or the second uplink transmission channel; or
when time domain resources occupied by the first uplink transmission channel and the second uplink transmission channel overlap, or an overlapping degree of the time domain resources occupied by the first uplink transmission channel and the second uplink transmission channel is greater than a pre-determined threshold, transmitting, by the terminal device, the first uplink transmission channel through a beam corresponding to the second uplink transmission channel.

2. The method according to claim 1, wherein the information of the beam corresponding to the each uplink transmission channel comprises a beam identity of the beam corresponding to the each uplink transmission channel.

3. The method according to claim 1, wherein the indication information carries information of the beam corresponding to the PUSCH, and information of the beam corresponding to the PUCCH.

4. The method of claim 1, wherein the indication information is used for instructing the terminal device to switch to a second network device and performing uplink transmission with the second network device based on the beam corresponding to the at least one uplink transmission channel.

5. The method of claim 4, wherein the switching to the second network device is based on path loss and beamformed gain between the terminal device and the second network device.

6. A method for uplink transmission, comprising:
generating, by a network device, indication information for indicating a beam corresponding to at least one uplink transmission channel of a terminal device, wherein a beam corresponding to each uplink transmission channel is used for transmitting the each uplink transmission channel; wherein information of the beam corresponding to the each uplink transmission channel comprises a beam index of the beam corresponding to the each uplink transmission channel, and the beam index of the beam corresponding to the each uplink transmission channel is used to indicate which beam in a pre-configured beam group is the beam corresponding to the each uplink transmission channel;
sending, by the network device, the indication information and a high-level signaling to the terminal device, wherein the beam group is a beam group configured by the network device to the terminal device through the high-level signaling, wherein the indication information is specific indication information for a terminal device or specific indication information for a group of terminal devices, wherein the at least one uplink transmission channel is a part of uplink transmission channels of the terminal device, and beams corresponding to remaining uplink transmission channels of the terminal device except the part of the uplink transmission channels remain unchanged, and wherein the uplink transmission channels of the terminal device comprise a first uplink transmission channel and a second uplink transmission channel, and the first uplink transmission channel and the second uplink transmission channel correspond to different beams,
when time domain resources occupied by the first uplink transmission channel and the second uplink transmission channel overlap, or an overlapping degree of time domain resources occupied by the first uplink transmission channel and the second uplink transmission channel is greater than a pre-determined threshold, receiving, by the network device, the first uplink transmission channel through a beam corresponding to the second uplink transmission channel; and
when the time domain resources occupied by the first uplink transmission channel and the second uplink transmission channel do not overlap, or the overlapping degree of the time domain resources occupied by the first uplink transmission channel and the second uplink transmission channel is less than the pre-determined threshold, receiving, by the network device, the first uplink transmission channel through a beam corresponding to the first uplink transmission channel.

7. The method according to claim 6, wherein the information of the beam corresponding to the each uplink transmission channel comprises a beam identity of the beam corresponding to the each uplink transmission channel.

8. The method according to claim 6, wherein the indication information carries information of the beam corresponding to the PUSCH, and information of the beam corresponding to the PUCCH.

9. A terminal device, comprising a processor, a transmission unit, and a transceiver, wherein:
the processor is used for receiving, through the transceiver, indication information and a high-level signaling sent by a network device, wherein the indication information is used for indicating a beam corresponding to at least one uplink transmission channel of the terminal device, and the beam corresponding to each uplink transmission channel is used for transmitting the each uplink transmission channel; wherein information of the beam corresponding to the each uplink transmission channel comprises a beam index of the beam corresponding to the each uplink transmission channel, and the beam index of the beam corresponding to the each uplink transmission channel is used to indicate which beam in a pre-configured beam group is the beam corresponding to the each uplink transmission channel; wherein the beam group is a beam group configured by the network device to the terminal device through the high-level signaling,
the processor is further used for performing uplink transmission according to the indication information and the high-level signaling, wherein the indication information is specific indication information for a terminal device or specific indication information for a group of terminal devices, wherein the at least one uplink transmission channel is a part of uplink transmission channels of the terminal device, and beams corresponding to remaining uplink transmission channels of the terminal device except the part of the uplink transmission channels remain unchanged, and wherein the uplink transmission channels of the terminal device comprise a first uplink transmission channel and a second uplink transmission channel, and the first uplink transmission channel and the second uplink transmission channel correspond to different beams, and
the transmission unit is used for performing a puncturing processing on the first uplink transmission channel or the second uplink transmission channel or adjusting transmission power of the first uplink transmission channel or the second uplink transmission channel if transmission power of the terminal device is insufficient when time domain resources occupied by the first uplink transmission channel and the second uplink transmission channel overlap; or
the transmission unit is used for transmitting the first uplink transmission channel through a beam corresponding to the second uplink transmission channel when time domain resources occupied by the first uplink transmission channel and the second uplink transmission channel overlap, or an overlapping degree of time domain resources occupied by the first uplink transmission channel and the second uplink transmission channel is greater than a pre-determined threshold.

10. The terminal device according to claim 9, wherein the information of the beam corresponding to the each uplink transmission channel comprises a beam identity of the beam corresponding to the each uplink transmission channel.

11. The terminal device according to claim 9, wherein the indication information carries information of the beam corresponding to the PUSCH, and information of the beam corresponding to the PUCCH.

12. A network device comprising a processor, a first receiving unit, a second receiving unit, and a transceiver,
wherein the processor is used for generating indication information for indicating a beam corresponding to at least one uplink transmission channel of a terminal device, wherein a beam corresponding to each uplink transmission channel is used for transmitting the each uplink transmission channel;
wherein information of the beam corresponding to the each uplink transmission channel comprises a beam index of the beam corresponding to the each uplink transmission channel, and the beam index of the beam corresponding to the each uplink transmission channel is used to indicate which beam in a pre-configured beam group is the beam corresponding to the each uplink transmission channel;
wherein the transceiver is used for sending the indication information and a high-level signaling to the terminal device; wherein the beam group is a beam group configured by the network device to the terminal device through the high-level signaling;
wherein the indication information is specific indication information for a terminal device or specific indication information for a group of terminal devices, and wherein the at least one uplink transmission channel is a part of uplink transmission channels of the terminal device, and beams corresponding to remaining uplink transmission channels of the terminal device except the part of the uplink transmission channels remain unchanged,
wherein the uplink transmission channels of the terminal device comprise a first uplink transmission channel and a second uplink transmission channel, and the first uplink transmission channel and the second uplink transmission channel correspond to different beams,
wherein the first receiving unit is used for receiving the first uplink transmission channel through a beam corresponding to the second uplink transmission channel when time domain resources occupied by the first uplink transmission channel and the second uplink transmission channel overlap or an overlapping degree of time domain resources occupied by the first uplink transmission channel and the second uplink transmission channel is greater than a pre-determined threshold, and
wherein the second receiving unit is used for receiving the first uplink transmission channel through a beam corresponding to the first uplink transmission channel when the time domain resources occupied by the first uplink transmission channel and the second uplink transmission channel do not overlap or the overlapping degree of the time domain resources occupied by the first uplink transmission channel and the second uplink transmission channel is less than the pre-determined threshold.

13. The network device according to claim 12, wherein the information of the beam corresponding to the each uplink transmission channel comprises a beam identity of the beam corresponding to the each uplink transmission channel.

14. The network device according to claim 12, wherein the indication information carries information of the beam corresponding to the PUSCH, and information of the beam corresponding to the PUCCH.

* * * * *